United States Patent

Orimo et al.

Patent Number: 5,292,237
Date of Patent: Mar. 8, 1994

[54] MELT PUMP

[75] Inventors: Taii Orimo; Shinichi Fukumizu; Hideki Uota; Masashi Konno; Nobuki Nagami, all of Kobe, Japan

[73] Assignee: Kabushiki Kaisha Kobe Seiko Sho, Kobe, Japan

[21] Appl. No.: 864,798

[22] Filed: Apr. 7, 1992

[51] Int. Cl.$^5$ .............................................. F04C 15/00
[52] U.S. Cl. .......................................... 418/94; 418/202
[58] Field of Search ............................ 418/94, 202, 83

[56] References Cited

U.S. PATENT DOCUMENTS 4,073,607 2/1978 Webb et al. ...................... 418/94 X

FOREIGN PATENT DOCUMENTS 3-100396 4/1991 Japan ...................... 418/83

*Primary Examiner*—Richard E. Gluck
*Attorney, Agent, or Firm*—Oblon, Spivak, McClelland, Maier & Neustadt

[57] ABSTRACT

A melt pump comprises a pump housing having an intake port and a discharge port and a pair of gear rotors. Each of the pair of gear rotors having a gear part and a shaft part integrated with each other, which are arranged within the pump housing in such a manner as to be rotatable in mutually meshing condition. The melt pump further comprises a recovering passage for guiding resin leaking through a clearance between the pump housing and each of the pair of gear rotors into the intake port, a cooling hole drilled inside each of the gear rotors while facing to each clearance forming region; and a pipe inserted into the cooling hole for supplying cooling liquid. A sleeve for lining the internal periphery of the cooling hole is located in the hole so as to utilize the inside of the sleeve as a cooling liquid passage.

3 Claims, 4 Drawing Sheets

MELT PUMP

BACKGROUND OF THE INVENTION 1. Field of the Invention

The present invention relates to a melt pump used in a kneading granulating apparatus for boosting melted resin between a kneading machine and a pelletizer. 2. Description of the Prior Art The melt pump is used to boost the pressure of melted resin at 200° to 300° C. delivered from a kneading machine up to 200 to 300 kg/cm$^2$ and to supply it to a pelletizer. Consequently, it needs to meet the high temperature/high pressure specifications, and particularly, to have the seal structure of special design.

In FIG. 5, the gear rotor 6 is supported on a pair of bearing bodies 30. Lubrication of these bearing bodies 30 is achieved by melted resin forcibly supplied by the discharge pressure. Then, clearances are positively formed between the pump housing 3 and the gear rotor 6. Melted resin leaking through these clearances 7 is made to flow into the intake port of the pump housing 3 to be recovered.

In the technique of the prior art, resin flowing through the clearances 7 sometimes makes exothermic action by receiving shearing action, resulting in deterioration of its quality. Therefore, a cooling hole 9 is formed inside the gear rotor 6, and a pipe 10 is inserted in the cooling hole 9, thus cooling the gear rotor 6 side with cooling liquid.

As described above, in the prior art, deterioration of recovered resin due to its exothermic action can be prevented. However, the prior art is disadvantageous in that adverse affects influenced by cooling on the gear rotor 6 often occur. The melt pump must meet the high temperature/high pressure specifications, and employs the gear rotor composed of high tension steel such as SNCM material. The central portion of the high tension steel is sometimes cooled with industrial water containing impurities. This induces a fear of yielding heat shock, stress corrosion, corrosive fatigue, etc. on the gear rotor 6, resulting in cracks on the internal periphery of a cooling hole.

SUMMARY OF THE INVENTION

It is therefore an object of the present invention to provide a melt pump characterized by fitting a sleeve on the internal periphery of the cooling hole of the gear rotor, to thereby carry out lining thereon.

To achieve the above object, the present invention provides a melt pump comprising: a pump housing having an intake port and a discharge port; a pair of gear rotors, each having a gear part and a shaft part integrated with each other, which are arranged within the pump housing in such a manner as to be rotatable in mutually meshing condition; a recovering passage for guiding resin leaking through a clearance between the pump housing and each of the gear rotor into the intake port; a cooling hole drilled inside each of the gear rotors while facing to each clearance forming region; and a pipe inserted into the cooling hole for supplying cooling liquid, wherein a sleeve for lining the internal periphery of the cooling hole is in the hole so as to utilize the inside of the sleeve as a cooling liquid passage.

Resin leaking into clearances between a pump housing and a gear rotor is subjected to shearing action due to rotation of the gear rotor to make exothermic action. This heat is transmitted from the gear rotor to a sleeve located inside its cooling hole.

In the present invention, the cooling liquid is usually supplied from the pipe inside the sleeve to cool the sleeve since a cooling liquid passage is defined between an interior surface of the sleeve and an exterior surface of the pipe inside surface. Consequently, the shearing heat is absorbed thereby preventing deterioration of leaking resin due to its exothermic action, and the gear rotor is kept from direct contact with the cooling liquid thereby preventing or alleviating both corrosion and heat shock.

BRIEF DESCRIPTION OF THE DRAWINGS

The above and other objects, features and advantages of the present invention will be more apparent from the following description taken in connection with the accompanying drawings, in which.

DESCRIPTION OF THE PREFERRED EMBODIMENT

Hereinafter the exemplary embodiments of the present invention will be described in detail with reference to the accompanying drawings.

Figure 1:
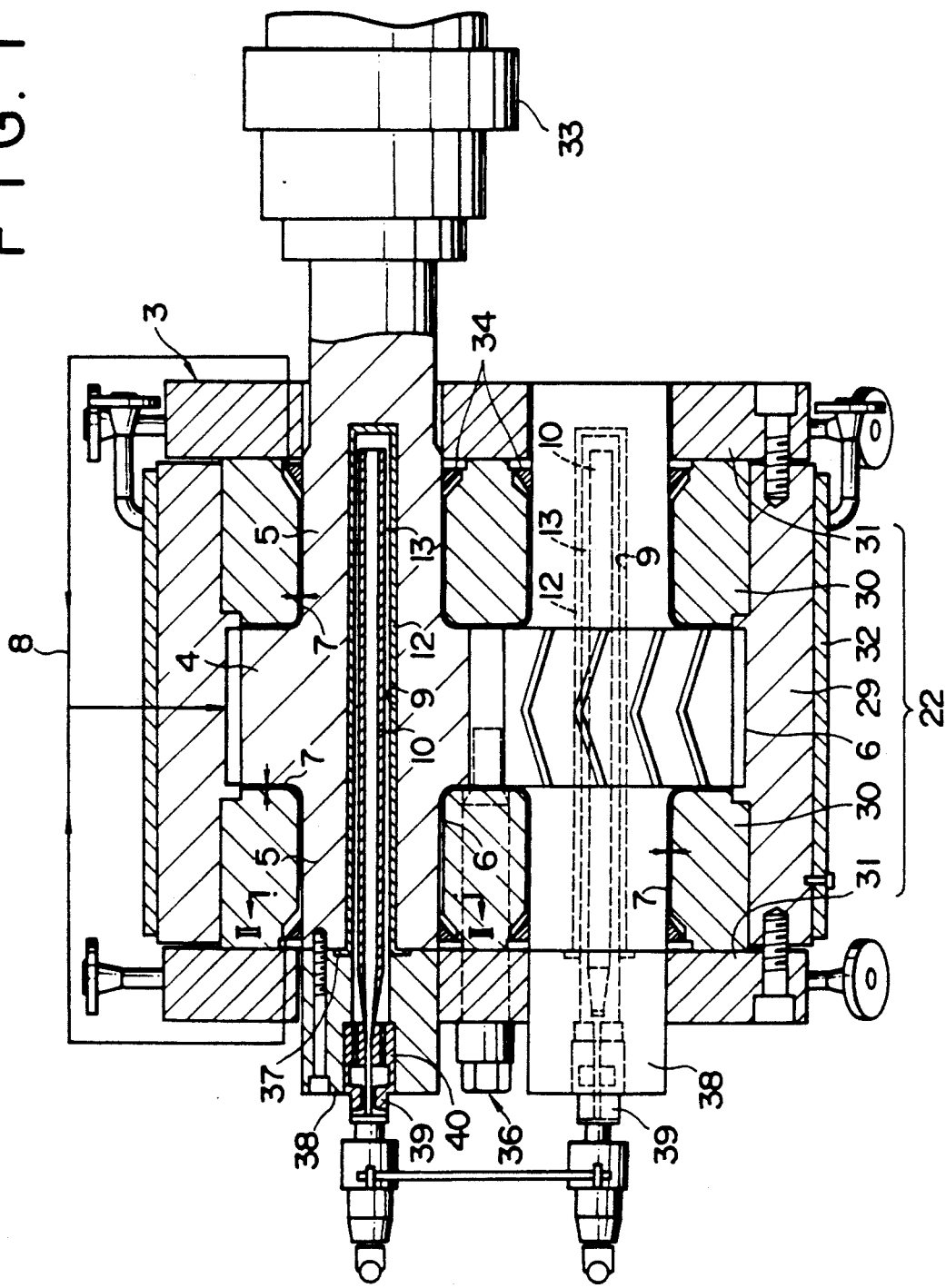
FIG. 1 is an explanatory view of partial cross section showing a preferred embodiment of the present invention.
Figure 2:
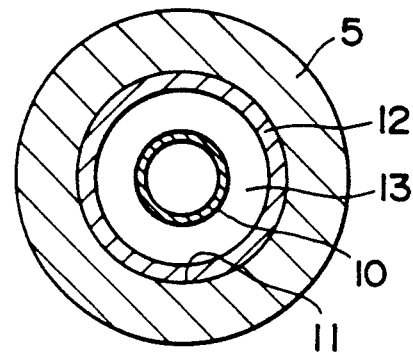
FIG. 2 is a cross section taken in I—I line shown in FIG. 1.
Figure 3:
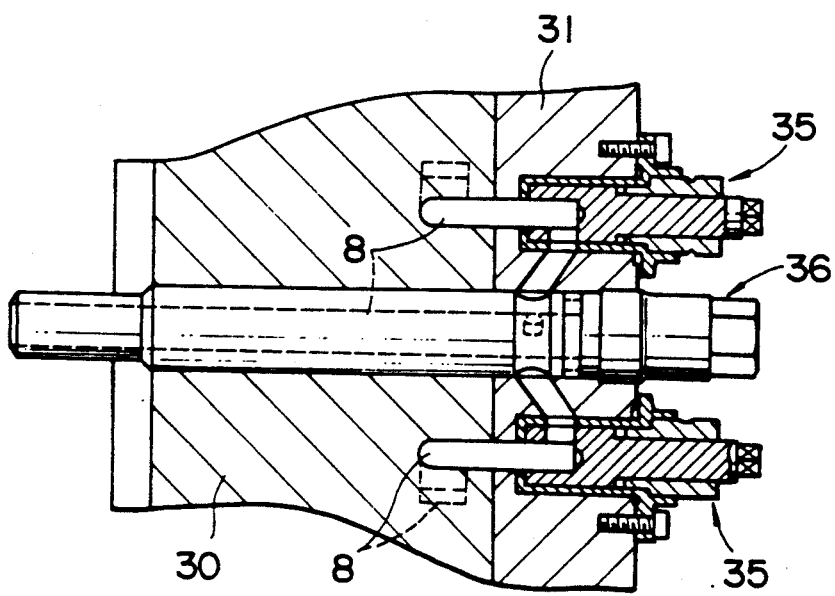
FIG. 3 is a cross-section view showing a recovering passage.
Figure 4:
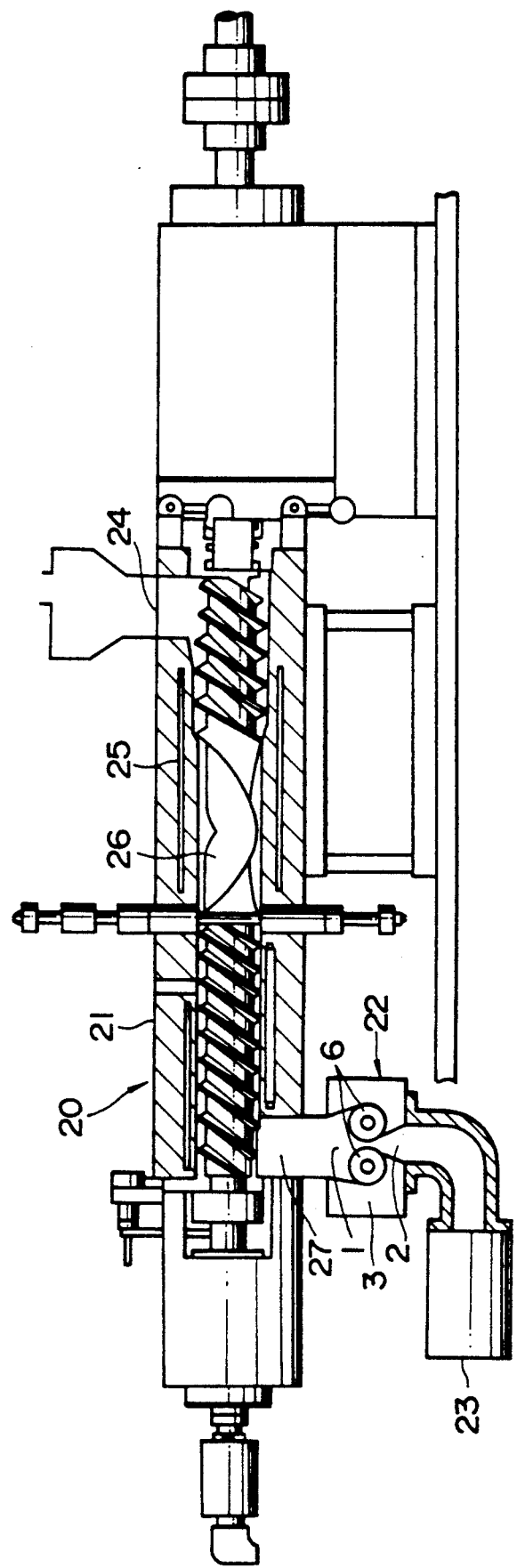
FIG. 4 is an explanatory view of partial cross section showing the whole of a kneading granulating device.
Figure 5:
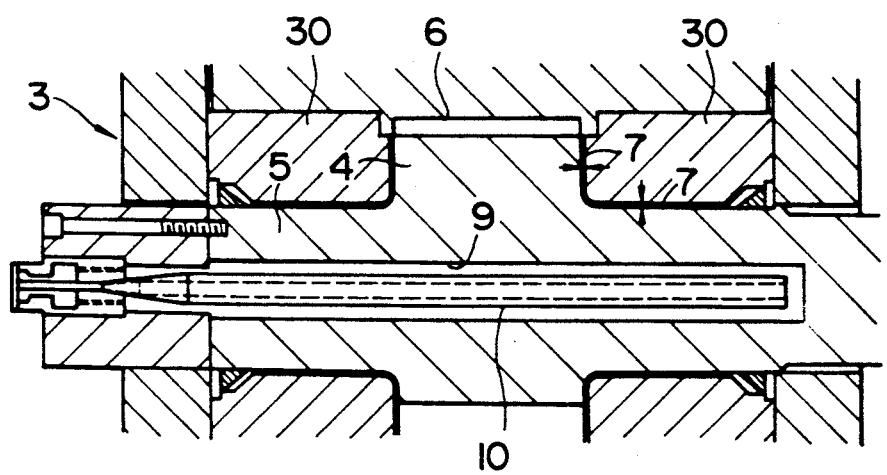
FIG. 5 is a cross-section view showing a conventional gear rotor.

In FIG. 4, a kneading granulating device 20 includes a kneading machine 21, a melt pump 22 and a pelletizer 23. Resin material and addition agent, etc. are supplied into a chamber 25 from the supply port 24 of the kneading machine 21, and are then kneaded and melted by means of two rotors 26 arranged in parallel to each other. The melted resin is boosted by a melt pump 22 from an exhaust port 27 and is supplied to the pelletizer 23.

In FIGS. 1 to 4, the melt pump 22 has a pair of gear rotors 6 inside a pump housing 3. The pump housing 3 has a pair of right and left bearing bodies 30 inside a body 29. Side plates 31 are disposed on the right and left sides of those bearing bodies 30 and are fixed to the body 29. An intake port 1 and an exhaust port 2 are formed on the kneading machine 21 side and the pelletizer 23 side, respectively. A numeral 32 shows a heating panel.

Each of the pair of gear rotors 6 is formed of a gear part 4 and a shaft part 5 integrated with each other. The shaft part 5 across both sides of the gear part 4 is rotatably supported by the bearing bodies 30. One of the gear rotors 6 is connected to a drive unit via a coupling 33. Gear parts 4 are meshed with a pair of gear rotors 6.

Clearances 7 are formed between right/left side faces of the gear part 4 of the gear rotor 6 plus the external periphery of the shaft part 5, and bearing bodies 30, respectively. Accordingly, melted resin forcibly fed from each gear part 4 can be leaked therethrough. Each clearance 7 is prevented from its pressure drop by means of seal rings 34 provided in the shaft part 5 at the end part of each side plate 31 side and connected to each recovering passage 8.

Each recovering passage 8 passes each valve 35 installed in a side plate 31 for every shaft part 5 and is collected in a member 36 from two valves 35 and communicated to the intake port 1 of the pump housing 3.

Each gear rotor 6 has a cooling hole 9 coaxial with the shaft core drilled through it from its one end so as to define regions having a length longer than those of the clearances. The cooling hole 9 is fitted with a sleeve 12 in close contact with its internal periphery.

The sleeve 12 is adapted to form a lining on the internal periphery of the cooling hole 9. It is in a bottomed cylindrical shape provided with a flange part 37 on its opening end. The flange part 37 is abutted on one end on the outer face of the gear rotor 6 and checked against its slipping off by means of each cooling adaptor 38.

For instance, mild steel, etc. such as STPG 38, S 25C, etc. can be used as the material for the above-mentioned sleeve 12. The material needs to have an excellent heat resistance, thermal conductivity, and linear expansion coefficient which is almost similar to that of the gear rotor 6. In addition, it also needs an excellent corrosion resistance and is applied with surface treatment such as plating on the internal periphery of the sleeve 12. However, as for the plating, attention must be paid because cracks of plating can take place owing to the difference in heat shock and linear expansion coefficient. In order to improve the corrosion resistance, local application of anti-corrosive zinc on the bottom and near the opening of the sleeve 12 is considered better than the total plating.

The sleeve 12 can be easily fitted in/removed from the gear rotor 6 owing to the provision of the flange part 37, and it can be replaced with a new one when its corrosion develops.

A pipe coupler 39 is inserted in the above-mentioned cooling adaptor 38 with its free relative rotation and the pipe 10 connected to this pipe coupler 39 is inserted in the sleeve 12.

The pipe coupler 39 is communicated to a means for supplying cooling water such as industrial water. The cooling water can supply cooling water in the pipe 10. The cooling water passes inside the pipe 10 and enters the sleeve 12 from its tip and passes through the exhaust hole 40 of the pipe coupler 39 again and is discharged outward.

The internal periphery of the sleeve 12 also serves as a cooling water passage 13, through which the cooling water flows and which absorbs the heat of the gear rotor 6 through the sleeve 12 and also absorbs shearing heat of the melted resin inside clearances 7.

As described above, since the gear rotor 6 has the sleeve 12 for lining the internal periphery 11 of the cooling hole 9 fitted therein, cooling water supplied from the pipe 10 is defined to flow through the cooling liquid passage 13 laid inside the sleeve 12. Consequently, the gear rotor 6 itself subjected to stress makes no direct contact with the cooling liquid so that any heat shock can be relaxed, and stress corrosion, corrosive fatigue, etc. and also generation of cracks can be prevented. In addition, since adverse effects effect on the gear rotor 6 by cooling is reduced, the degree of freedom for selecting the material of the gear rotor 6 itself is increased and high speed operation and also miniaturization of the whole size of melt pump become possible.

What is claimed is:

1. A melt pump comprising:
   a pump housing having an intake port and a discharge port;
   a pair of gear rotors, each having a gear part and a shaft part integrated with each other, which are arranged within said pump housing in such a manner as to be rotatable in mutually meshing condition;
   a recovering passage for guiding resin leaking through a clearance between said pump housing and each of said gear rotors into said intake port;
   a cooling hole drilled inside each of said gear rotors;
   a pipe inserted into the cooling hold of each of said gear rotors for supplying cooling liquid to said pump housing; and
   a sleeve inserted into each of said cooling holes for lining an internal periphery of each of said cooling holes, such that an internal periphery of said sleeve and an external periphery of said pipe define a cooling liquid passage for leading said cooling liquid supplied through said pipe to an exhaust means, and said sleeve prevents said cooling liquid supplied through said pipe from directly contacting said gear rotors.

2. The melt pump according to claim 1, wherein an opening end of said sleeve comprises a flange part which abuts against one end of the shaft part of each of the gear rotors for permitting the insertion and removal of the sleeve into and from the cooling hole.

3. The melt pump according to claim 2, further comprising a cooling adaptor having a pipe coupler communicating with a means for supplying cooling liquid to said pipe, the flange part of said sleeve being inserted and held between said one end of the shaft part of the gear rotor and the cooling adaptor.

* * * * *

UNITED STATES PATENT AND TRADEMARK OFFICE
CERTIFICATE OF CORRECTION

PATENT NO. : 5,292,237
DATED : March 8, 1994
INVENTOR(S) : Taiji ORIMO, et al.

It is certified that error appears in the above-indentified patent and that said Letters Patent is hereby corrected as shown below:

On the title page, Item [75], the 1st inventor's first name should read as follows:

--Taiji Orimo--

Signed and Sealed this

Twelfth Day of July, 1994

Attest:

BRUCE LEHMAN

Attesting Officer     Commissioner of Patents and Trademarks